Patented July 20, 1954

2,684,177

UNITED STATES PATENT OFFICE 2,684,177

COATED BAKING PAN AND METHOD OF MAKING SAME

Daniel W. Kennedy, Troy, N. Y., assignor to General Electric Company, a corporation of New York No Drawing. Application July 18, 1950, Serial No. 174,585

6 Claims. (Cl. 220—64)

This invention is concerned with coated pans used in the baking trade. More particularly, the invention relates to baking pans having a coating thereon, immediately adjacent the metallic surface of the baking pan, of an alkyd resin containing a small amount or minor proportion of stearine pitch.

It has been known in the baking art to employ various greasy vegetable or similar lubricating materials as coatings for baking pans prior to placing the baking material, for instance, the dough, in the said pan. It has been found that in order to obtain a brown outside finish on the completed baked article, it is necessary to pass the pan, prior to coating with the lubricant, through an oven or heated zone maintained at an elevated temperature in order to cause oxidation of the metallic surface, for example, the tin surface, of the baking pan. This oxidation causes the surface of the pan to darken and assume a hue ranging from light tan to dark brown. In the absence of such a prior oxidizing or baking step, it is impossible to obtain the desired darkened outer crust of the bread or cake which is usually associated with baked articles.

On May 17, 1949, there issued a patent U. S. 2,470,593, Webb et al., relating to the use of silicone resins to be applied to baking surfaces in place of such materials as various greases, lard, etc. The use of the silicone resins, many examples of which are described in Rochow Patents 2,258,218–222, issued October 7, 1941, obviates the necessity for the use of greasy lubricants in baking operations, and also permits numerous baking cycles before it is necessary to recoat the baking pan. In some instances, it has been found possible after application of a thin coating of a silicone resin to the baking pan and after conversion of the silicone resin to the substantially infusible, insoluble state, to use such a coated pan for baking purposes for a number of cycles ranging from about 40 to 75 times without requiring any further treatment of the baking pan. In spite of the improvement with regard to the use of silicone resins in place of the usual lubricants employed in baking operations, it has still been found necessary to conduct oxidation of the surface of the pan at elevated temperatures for example 400°–500° F. This step which is called by bakers a "burning in" operation, apparently gives better heat absorption and thus leads to the desired darkening of the outer surface of the bread or whatever object is being baked.

Several attempts have been made to avoid this extra "burning in" operation prior to coating with the silicone resin. These attempts have been centered around the thought of adding color to the silicone resinous coating. However, this has not been successful since in some instances the color was either too weak and the added cost was too great, or in other cases the film characteristics and the release properties of the silicone resins were essentially destroyed.

I have now discovered that I am able to eliminate the "burning in" operation usually associated with baking bread and other similar foodstuffs by applying a thin coating to the baking pan comprising an alkyd resin containing a small amount of stearine pitch prior to coating the baking pan with the silicone resin. After application of the stearine pitch-modified alkyd resin, the pan is baked shortly to effect curing of the alkyd resin prior to application of the silicone resin which is to be employed for release purposes. This undercoating of the alkyd resin and the stearine pitch serves many purposes. It obviates the necessity for burning in the baking pan. In addition, if applied not only to the inside of the pan but to the outside of the pan and to metal straps which surround the baking pans usually which are used in series of four, there is also obtained improved corrosion resistance of the metallic surfaces. Finally, it has also been discovered that the adhesion of the silicone resin to the baking pan is markedly improved by the use of this alkyd resin-stearine pitch primer or undercoating.

The stearine pitch employed in the practice of the present invention comprises the dark blackened residue which is obtained in the sulfuric acid treatment of fats and oils after distillation in steam of the washed acids (stearic, palmitic and oleic). The stearine pitch, which is also known as vegetable oil pitches, remains to the extent of about 2 per cent. The latter are for the most part the residue of hydrolyzed oils, that is, vegetable oils converted to fatty acids. They do not have any toxic effect or taste and when combined with the alkyd resin and employed in the manner described above are essentially inert during the baking process. The use of the stearine pitch in my invention appears to be critical. If dark-colored pigments, such as carbon black, iron oxide, finely divided copper (bronze), cadmium, pigments, etc., are used, they either settle out of the resinous vehicle or else would not give the necessary color to cause the desired browning of the bread.

The amount of stearine pitch employed may be varied within fairly wide limits without departing from the scope of the invention. Generally, I may employ such amounts of stearine pitch as are necessary to permit curing of the alkyd resin and to give the desired darkness of the alkyd resins which when applied to the baking pan will obviate the necessity for the burning in operation. Thus, I may use, for example, from about 5 to 12%, by weight, or more, and as high as 15%, by weight, of the stearine pitch based on the weight of the alkyd resin. Smaller amounts decrease the darkening effect while larger amounts are not necessary and may inhibit proper cure of the alkyl resin-stearine pitch mixture.

The particular alkyd resin employed in the practice of the invention may comprise any one of the well-known alkyd resinous coating compositions as, for example, products of reaction under heat of, for example, a polyhydric alcohol and a polycarboxylic acid free of olefinic unsaturation as the sole source of polycarboxylic acid, examples of the polyhydric alcohol comprising, e. g., ethylene glycol, diethylene glycol, propylene glycol, dipropylene glycol, glycerine, pentaerythritol, etc. Examples of polycarboxylic acids which may be employed are, for instance, succinic acid, adipic acid, phthalic acid or anhydride, etc. If desired, the alkyd resin may be modified with such ingredients as, for example, monohydric alcohols, monocarboxylic acids, various modifying oily ingredients as, for example, various synthetic oils, vegetable oils, mineral oils, animal oils, etc. Among such oils may be mentioned, for example, castor oil, hydrogenated castor oils, dehydrated castor oil, coconut oil fatty acids, hydrogenated coconut oils, safflower oil, etc.

Generally, the alkyd resin as it is prepared is preferably converted into a solution thereof (e. g., about 35 to 60% resin solids) which can be more easily combined with the stearine pitch, and the mixture of alkyd resin solution and stearine pitch thereafter diluted with a common solvent to give a low solids (e. g., about 10 to 20% solids) coating composition for the baking pans.

The method whereby my invention may be practiced is relatively simple and may, of course, be varied within wide limits as will be apparent to those skilled in the art. In one case, the alkyd resin containing the stearine pitch is applied in the form of a dilute solution to the surface of the baking pan to a thickness of the order of from about 0.01 to 0.1 mil or somewhat higher. Thereafter, the coated pan is preferably heated at temperatures of from about 100° to 150° C. for varying lengths of time from about 1 minute to about 5 to 10 minutes in order to drive off solvent and to effect from partial to complete curing of the alkyd resin. Then the desired organopolysiloxane resin or silicone resin, preferably in the form of a solution (e. g., from a 10 to 20% solids solution) is applied as a coating over the primer coating of the alkyd resin and stearine pitch. The thickness of the silicone resin may, of course, be varied and may range, for example, within the same thickness range described above in connection with the discussion of the alkyd resin. The thicknesses in both cases, however, are not critical and may be varied. Thereafter, the treated pan is baked at elevated temperatures of the order of from about 175° to 200° C. for varying lengths of time, for instance, from about 20 minutes to one hour in order to effect conversion of the silicone resins to the substantially insoluble and infusible state. For this purpose, higher baking temperatures and longer periods of time at such elevated temperatures are usually desirable in view of the fact that silicone resins are more difficult to cure to the infusible, insoluble state.

In order to accelerate the cure of the silicone resin, it has been found advisable to employ cure accelerators particularly a class of cure accelerators comprising metallic salts of organic acids. Such cure accelerators are more particularly disclosed and claimed in Welsh Patent 2,449,572, issued September 21, 1948, and assigned to the assignee of the present invention. Among the preferred catalysts which I have found eminently desirable in the practice of the present invention are those comprising zinc salts of organic acids, particularly zinc octoate.

In order that those skilled in the art may better understand how the present invention may be practiced the following example is given by way of illustration and not by way of limitation. All parts are by weight.

*Example I*

A tin bread baking pan was coated with an alkyd resin comprising (a) 27 parts of a 50% solids alkyd resin solution comprising the product of reaction of dehydrated castor oil, glycerine and phthalic anhydride, whereby the alkyd resin was dissolved in xylene, (b) 1.4 parts of stearine pitch (cottonseed oil by-product) which has been more particularly described above, and (c) 71.6 parts additional xylene to make a 15% solids solution. This coating composition was applied to the inside surface of the baking pan and the pan then heated at about 150° C. for about 10 minutes to effect evolution of the solvent and curing of the alkyd resin. To this heat-treated coated surface was then applied a coating of a 15% solids solution of a methyl phenyl silicone resin (obtained by cohydrolyzing 40 mol per cent methyltrichlorosilane, 30 mol per cent phenyltrichlorosilane, and 30 mol per cent dimethyldichlorosilane) dissolved in xylene and containing as a catalyst for the condensation of the silicone resin a small amount of the order of 0.5 per cent, by weight, zinc octoate, based on the weight of the silicone resin solids. The pan having the second coating comprising the silicone resin was then heated in a 200° C. oven for about one hour to effect curing of the silicone resin.

As a control a pan was coated only with the silicone resin omitting the stearine pitch-modified alkyd resin and another control sample comprised a pan which had been "burned in" but which contained no coating whatsoever of either the alkyd resin or the silicone resin. A series of cycles of bread were baked in the respective pans, only the pan free of the alkyd resin and silicone resin coatings being treated with a small amount of lard as a release agent for the bread. Baking of bread in the respective treated pans showed the following results. The pan which had been treated only with the lard and which had previously been "burned in" gave a satisfactory loaf of bread having the desired brownness and outside texture. The pan containing both the stearine pitch-modified alkyd resin and the silicone resin gave a loaf of bread similar to the above-described control sample using only lard, but in contrast to the latter pan in which only one loaf could be baked before requiring additional coatings with the lard, the sample containing the alkyd resin-stearine pitch and silicone resin combination could be used as many as 150 times without requiring renewal of the coating. The color and outer texture of the loaf of bread baked in the latter manner was satisfactory and comparable to the control sample. Finally, the loaf of bread baked in the third pan which had only been coated with the silicone resin browned up only slightly and was a pale, unattractive light tan which would be undesirable in the bread baking art. Moreover, it was found that in some instances the silicone resin in the latter case did not adhere satisfactorily to the tin surface of the baking pan and there appeared to be some flaking of the silicone resin after a number of cycles. This was not true in the case of the sample pan containing the alkyd resin-stearine pitch primer.

It will, of course, be apparent to those skilled in the art that the proportion of ingredients employed in the foregoing example may be varied within wide limits without departing from the spirit and scope of the invention. In addition, other types of alkyd resins and modifying ingredients, for example, other modifying oily ingredients may be employed in place of the alkyd resin and castor oil used above without departing from the scope of the invention. Finally, other silicone resins, many examples of which are found in the aforementioned Rochow patents and Webb et al. patents, may be used together with other cure accelerators in place of the ones described in the above examples, and I do not intend to be limited to any particular type of silicone resins since all are essentially satisfactory. I have found it preferable, however, to use as the alkyd resin the aforementioned castor oil-modified glyceryl phthalate alkyd resin and to use as the silicone resin alkylated polysiloxanes, e. g., the methyl phenyl polysiloxane resin described above. Other silicone resins may be used as, for instance, methyl, ethyl, propyl, butyl, methyl ethyl, ethyl phenyl, tolyl, etc. polysiloxanes, especially those containing an average of from 1.2 to 1.8 organic groups per silicon atom, e. g., hydrocarbon groups per silicon atom, which hydrocarbon groups may be substituted, for instance, with halogens, etc. The times of heat-treating the pan after the application of the individual coatings may also be varied as has been pointed out previously depending on such factors as, for example, the temperature, the desired coating thickness, the particular alkyd resin or silicone resin employed, the particular cure accelerator used, etc.

Bread pans treated in accordance with my invention have been found to have better corrosion protection and better abrasion resistance than many other materials tested. In addition, the adhesion of silicone resins to the baking pan surfaces which, in addition to being made of tin may also comprise stainless steel or chromium coated surfaces, is considerably improved when applied over a primer coating of the alkyd resin modified with a small amount of stearine pitch.

What I claim as new and desire to secure by Letters Patent of the United States is:

1. The method which comprises (1) applying to the surface of a baking pan a coating comprising an alkyd resin having incorporated therein from 5 to 15%, by weight, based on the weight of the alkyd resin, of stearine pitch, the said alkyd resin having been obtained by interaction under heat of a mixture of ingredients comprising a polyhydric alcohol and a polycarboxylic acid free of olefinic unsaturation as the sole polycarboxylic acid member of the mixture of ingredients, (2) heat treating the coated pan for a time sufficient to remove solvent from the aforementioned coating and to advance partially the cure of the alkyd resin, (3) applying a coating of an organopolysiloxane resin to the heat-treated alkyld resin and (4) subjecting the baking pan to elevated temperatures to effect conversion of the organopolysiloxane resin to the substantially infusible and insoluble state.

2. The method which comprises (1) applying to the surface of a baking pan a coating comprising an oil-modified glyceryl phthalate alkyd resin having incorporated therein from 5 to 15%, by weight, based on the weight of the alkyd resin, of stearine pitch, (2) treating the coated pan for a time sufficient to remove solvent from the aforementioned coating and to advance partially the cure of the alkyd resin, (3) applying a coating of an organopolysiloxane resin to the aforesaid heat-treated oil-modified alkyd resin and (4) subjecting the baking pan to elevated temperatures to effect conversion of the organopolysiloxane resin to the substantially infusible and insoluble state.

3. The method which comprises (1) applying to the surface of a baking pan a coating comprising a castor oil-modified glyceryl-phthalate alkyd resin having incorporated therein from 5 to 15%, by weight, based on the weight of the alkyd resin, of stearine pitch, (2) heat treating the coated pan for a time sufficient to remove solvent from the aforementioned coating and to advance partially the cure of the alkyd resin, (3) applying a coating of a methyl phenyl polysiloxane resin to the said heat treated oil-modified alkyd resin and (4) subjecting the baking pan to elevated temperatures to effect conversion of the organopolysiloxane resin to the substantially infusible and insoluble state.

4. A baking pan comprising a metal base whose surface is provided with a series of coatings thereon comprising (1) a heat-treated coating of an alkyd resin having incorporated therein from 5 to 15%, by weight, based on the weight of the alkyd resin, of stearine pitch, the said coating being immediately adjacent the metallic base, and (2) an organopolysiloxane resinous coating in the substantially infusible and insoluble state superposed on top of the alkyd resinous coating, the aforesaid alkyd resin having been obtained by effecting reaction under heat of a mixture of ingredients comprising a polyhydric alcohol and a polycarboxylic acid free of olefinic unsaturation as the sole polycarboxylic acid member of the mixture of ingredients.

5. A baking pan comprising a tin base whose surface is provided with a series of coatings thereon comprising (1) a heat-treated glyceryl-phthalate alkyd resin having incorporated therein from 5 to 15%, by weight, based on the weight of the alkyd resin, of stearine pitch, the said coating being immediately adjacent the tin base and (2) a hydrocarbon-substituted polysiloxane resinous coating in the substantially infusible and insoluble state superposed on top of the alkyd resinous coating.

6. A baking pan comprising a tin base whose surface is provided with a series of coatings thereon comprising (1) a heat-treated coating of a castor oil-modified glyceryl-phthalate alkyd resin having incorporated therein from 5 to 15%, by weight, based on the weight of the alkyd resin, of stearine pitch, the said coating being immediately adjacent the tin base, and (2) a methyl phenyl polysiloxane resinous coating in the substantially infusible and insoluble state superposed on top of the alkyd resinous coating.

References Cited in the file of this patent

UNITED STATES PATENTS

| Number | Name | Date |
|---|---|---|
| 1,912,372 | Jacobson | June 6, 1933 |
| 1,921,292 | Harvey | Aug. 8, 1933 |
| 2,149,805 | Butler | Mar. 7, 1939 |
| 2,185,354 | Pellerano | Jan. 2, 1940 |
| 2,230,230 | Boggs | Feb. 4, 1941 |
| 2,257,595 | Danielson | Sept. 30, 1941 |
| 2,317,487 | Schuelke | Apr. 27, 1943 |
| 2,362,934 | Schlaanstine | Nov. 14, 1944 |
| 2,424,813 | Gegner | July 29, 1947 |
| 2,453,471 | Switzer et al. | Nov. 9, 1948 |
| 2,462,242 | Webb et al. | Feb. 22, 1949 |
| 2,470,593 | Webb et al. | May 17, 1949 |
| 2,516,030 | Swiss | July 18, 1950 |